United States Patent [19]

Karasik et al.

[11] Patent Number: 4,966,406
[45] Date of Patent: Oct. 30, 1990

[54] COVER DEVICE FOR MOTOR VEHICLES

[75] Inventors: Alexander Karasik, Bat Yam; David Oron, Hod Hasharon, both of Israel

[73] Assignee: Soldon Achzakot (1990) Ltd.

[21] Appl. No.: 366,386

[22] Filed: Jun. 15, 1989

[30] Foreign Application Priority Data

Oct. 7, 1988 [IL] Israel ......................................... 87970

[51] Int. Cl.⁵ .................................................. B60J 11/00
[52] U.S. Cl. ........................................ 296/98; 296/136; 296/180.1
[58] Field of Search ..................... 296/98, 136, 180.1

[56] References Cited

U.S. PATENT DOCUMENTS

| | | | |
|---|---|---|---|
| 1,719,055 | 7/1929 | Herzer | 296/136 X |
| 3,992,053 | 11/1976 | Hrytzak et al. | 296/136 X |
| 4,699,192 | 10/1987 | Kamen et al. | 296/136 X |
| 4,825,889 | 5/1989 | Monteith | 296/136 X |

FOREIGN PATENT DOCUMENTS

| | | | |
|---|---|---|---|
| 493116 | 9/1977 | Australia | 296/98 |
| 2731951 | 2/1979 | Fed. Rep. of Germany | 296/98 |
| 3500693 | 7/1986 | Fed. Rep. of Germany | 296/136 |
| 3708378 | 9/1988 | Fed. Rep. of Germany | 296/136 |
| 1367578 | 6/1964 | France | 296/136 |
| 2466366 | 4/1981 | France | 296/136 |

Primary Examiner—Johnny D. Cherry
Assistant Examiner—Gary C. Hoge
Attorney, Agent, or Firm—Benjamin J. Barish

[57] ABSTRACT

A cover device for covering a motor vehicle, comprises a housing attachable to the vehicle trunk lid, and a cover of flexible sheet material disposed within the housing and withdrawable therefrom to cover the vehicle. The cover comprises a main section of sufficient length to extend from its housing over the top of the vehicle and its front end and to be attached to the vehicle front bumper, a rear section of sufficient length to extend from the housing and to be attached to the rear bumper of the vehicle, and a pair of side sections secured to the sides of the main section to cover the sides of the vehicle. The main and side sections of the cover include a plurality of parallel, elongated, stiffening rods extending transversely of the main section and spaced longitudinally thereof.

5 Claims, 2 Drawing Sheets

COVER DEVICE FOR MOTOR VEHICLES

BACKGROUND OF THE INVENTION

The present invention relates to a cover device for covering a motor vehicle, in order to protect it from the sun, airborne pollutants, and the like.

Many cover devices for covering motor vehicles have been proposed, as disclosed in the following U.S. Pat. Nos.: 1,719,055, 1,912,231, 1,918,423, 2,646,097, 3,222,102, 3,316,012, 3,563,594, 3,763,908, 3,785,697, 3,992,053, 4,174,134, 4,216,989, 4,324,427, 4,596,418, 4,612,967, 4,657,298, 4,718,711, 4,732,421. However, insofar as we are aware, none of these devices has come into widespread use, probably because these known devices are generally not entirely satisfactory from the standpoint of the ease of application and removal of the cover with respect to the vehicle.

OBJECTS AND SUMMARY OF THE INVENTION

An object of the present invention is to provide a cover device for motor vehicles which permits the cover to be applied and removed in a quick and facile manner.

Another object of the invention is to provide a cover device for motor vehicles which, in the stored condition of the cover, enables the cover device, particularly its housing, to serve as a spoiler or rear wing for the vehicle.

According to the present invention, there is provided a cover device for covering a motor vehicle having a front end, doors and windows on the opposite sides of the vehicle, a front bumper, a rear end including a trunk and trunk lid, and a rear bumper. The cover comprises a housing attachable to the vehicle, and a cover of flexible sheet material disposed within the housing and withdrawable therefrom to cover the vehicle. The cover comprises a main section of sufficient length to extend from the housing over the top of the vehicle and its front end and to be attached to the vehicle front bumper, and a pair of side sections secured to opposite sides of the main section to cover the doors and windows on the opposite sides of the vehicle. The cover further includes a first plurality of parallel, elongated, stiffening rods carried by and extending continuously substantially completely across the main section and spaced longitudinally thereof, and a second plurality of parallel, elongated stiffening rods carried by and extending along the side sections of the cover, the second plurality of rods extending continuously substantially from the edge of the respective side section adjacent the main section, to the opposite edge of the side section.

According to another aspect of the invention, the upper face of the housing is in the shape of an airfoil effective to cause the housing, when attached to the vehicle trunk lid, also to serve as a spoiler or rear wing for the vehicle.

As will be described more particularly below, a device constructed in accordance with the foregoing features permits the cover to be applied over the vehicle and also to be removed therefrom in a quick and facile manner. Also, when the cover is in its stored position within the housing, the housing serves the additional function of a spoiler or rear wing for the vehicle.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
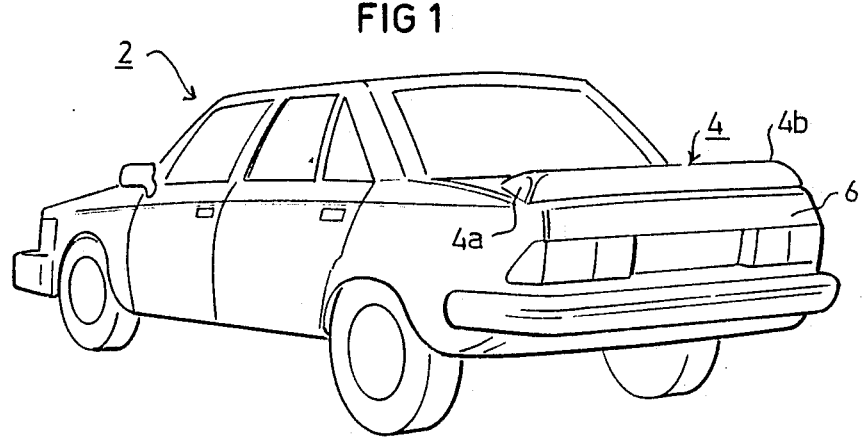
FIG. 1 illustrates a vehicle equipped with a cover device in accordance with the present invention, the cover being in its stored position within the cover device.
Figure 2:
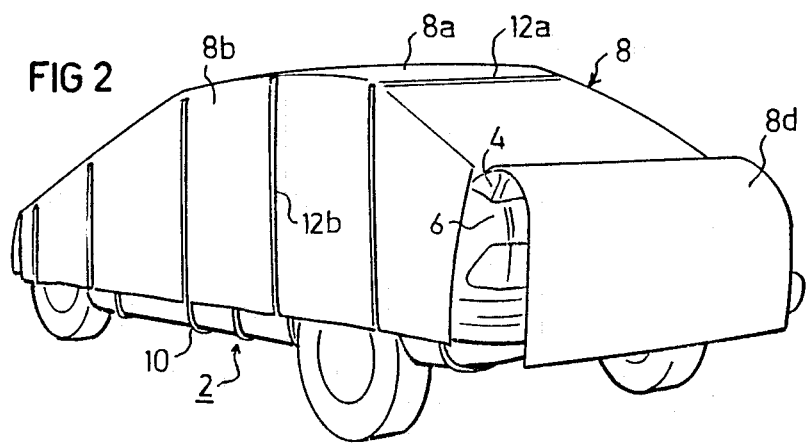
FIG. 2 illustrates the cover within the cover device extended from its housing in its operative position for covering the vehicle.

With reference first to FIG. 1, there is illustrated a vehicle, generally designated 2, equipped with a cover device including a housing, generally designated 4, attached in any suitable manner to the vehicle trunk lid 6. Housing 4 encloses a cover, generally designated 8, adapted to be withdrawn from the housing to cover the vehicle when the vehicle is not in use, as shown in FIG. 2. Housing 4 is formed with a relatively flat base 4a engaging the vehicle trunk lid 6, and with a top wall 4b of generally arcuate configuration to serve as an airfoil. The housing construction is such that when the cover 8 is in its stored position within the housing 4, the housing also serves as a spoiler or rear wing for the vehicle.

Figure 3:
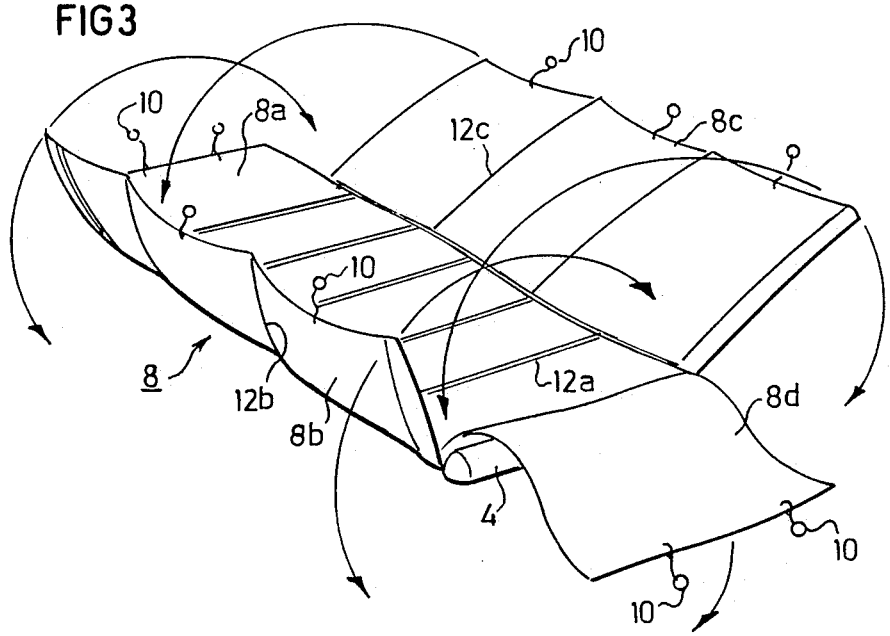
FIG. 3 illustrates the structure of the cover in the device of FIGS. 1 and 2.

The structure of cover 8 is more particularly illustrated in FIGS. 2 and 3. It is constituted of: a main section 8a of sufficient length to extend from its housing 4 over the top of the vehicle and the front end of the vehicle so as to be attached to the front bumper; a pair of side sections 8b, 8c secured to the sides of main section 8a to cover the sides of the vehicle; and a shorter rear section 8d of sufficient length to extend from the housing and to be attached to the rear bumper of the vehicle. As shown particularly in FIG. 3, the free ends of each of the sections 8a, 8b, 8c and 8d include fasteners, in the form of clips 10, for fastening the respective ends of the cover sections to the vehicle.

The cover 8 may be made of any suitable flexible sheet material, such as plastic, canvas, linen, or cloth. The various sections may be joined together in any suitable manner, such as by stitches, adhesives, fasteners, heat-welding, zippers, or the like. Preferably, the cover 8 is withdrawable from its housing 4 by a winding and reeling mechanism disposed within the housing.

The main section 8a and the two side sections 8b, 8c of the cover are formed with elongated pockets each adapted to receive a stiffening rod, as shown at 12a, 12b and 12c, respectively. Such pockets and stiffening rods are not needed in the rear cover section 8d because of its relative shortness. As shown in FIG. 3, the pockets and stiffening rods 12a in cover section 8a are disposed in parallel, spaced relationship extending completely transversely across the cover section and spaced longitudinally thereof. The pockets and stiffening rods 12b and 12c in the side sections 8b and 8c, respectively, are also disposed in spaced parallel relationship but are in alignment with the pockets and stiffening rods 12a of the main section 8a. The latter rods 12b, 12c extend continuously substantially from the edge of the respective side section 8b, 8c, adjacent the main section 8a, to the opposite (free) edge of the respective side section.

The stiffening rods permit the two side sections 8b, 8c to be folded against the main section 8a, and all three sections folded on top of each other, to be reeled into the housing 4, together with the rear cover section 8d, when the cover is not to be used for covering the vehicle.

When the cover is withdrawn from the housing 4, the stiffening rods 12a, 12b, 12c in the cover main section 8a and side sections 8b and 8c, respectively, impart the basic shape to the cover to enclose the vehicle, and thereby facilitate the application of the cover to the vehicle. Thus, when the cover sections are withdrawn from the housing 4, all four cover sections naturally assume their respective positions over the vehicle, so that it is only necessary to attach their ends to the vehicle by the use of fasteners 10. Thus, fasteners 10 carried by the main cover section 8a and rear cover section 8d, would be attached to the bottoms of the front and rear bumpers, respectively; whereas the fasteners 10 carried at the ends of the side sections 8b and 8c would be attached to the sides of the vehicle frame underlying the doors.

The stiffening rods 12a-12c serve the additional function of spacing the inner faces of the respective cover sections from the vehicle surface, thereby to provide air gaps between the vehicle surface and the cover.

Figure 4:
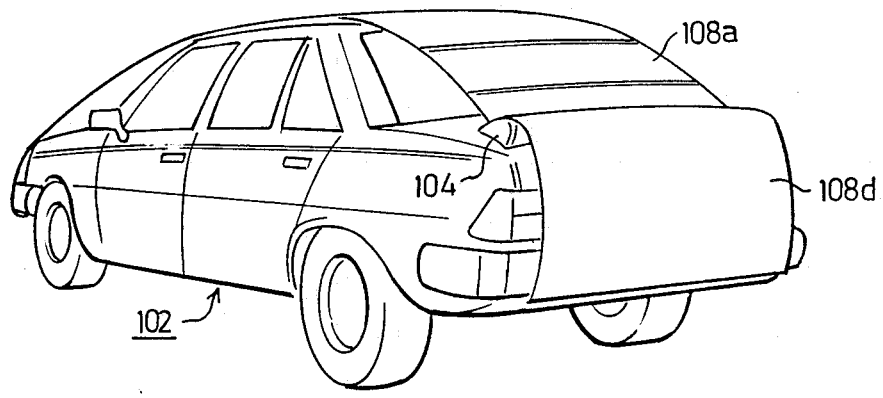
FIG. 4 illustrates a modification in the construction of the cover device wherein the cover is applied only along the top of the vehicle and omits the side sections for purposes of simplicity.

FIG. 4 illustrates a variation, wherein the side sections, corresponding to side sections 8b, 8c in FIGS. 2 and 3, have been omitted in order to simplify the construction of the device and also the manner of its application to cover the vehicle. Thus, the embodiment illustrated in FIG. 4 also includes a housing 104 and a cover stored within it having only a main section 108a and a rear section 108d, corresponding to cover sections 8a, 8d in the embodiment of FIGS. 1-3. As mentioned above, the embodiment of FIG. 4 omits the side sections corresponding to cover sections 8b and 8c, thereby leaving the sides of the vehicle 102 exposed. In all other respects, the cover device illustrated in FIG. 4 is the same as described above with respect to FIGS. 1-3.

While the invention has been described with respect to two preferred embodiments, it will be appreciated that many other variations may be made. For example, the housing for the cover may be fixed to the vehicle at other locations, e.g., on the vehicle roof. In addition, the cover device may be operated by remote control via a motor which rewinds the cover into its housing. Other variations, modifications and applications of the invention will be apparent.

What is claimed is:

1. A cover device for covering a motor vehicle having a front end, doors and windows on the opposite sides of the vehicle, a front bumper, a rear end including a trunk and trunk lid, and a rear bumper, comprising: a housing attachable to the vehicle; and a cover of flexible sheet material disposed within said housing and withdrawable therefrom to cover the vehicle; said cover comprising a main section of sufficient length to extend from said housing over the top of the vehicle and its front end and to be attached to the vehicle front bumper, and a pair of side sections secured to opposite sides of the main section to cover the doors and windows on the opposite sides of the vehicle; a first plurality of parallel, elongated, stiffening rods carried by and extending continuously substantially completely across the main section and spaced longitudinally thereof; and a second plurality of parallel, elongated stiffening rods carried by and extending along said side sections of the cover, said second plurality of rods extending continuously substantially from the edge of the respective side section adjacent said main section to the opposite edge of the side section.

2. The device according to claim 1, wherein said housing is attachable to a rear part of the vehicle, and said cover further comprises a rear section of sufficient length to extend from the housing and to be attached to the rear bumper of the vehicle.

3. The device according to claim 1, wherein said stiffening rods in the main section and the side sections are received within pockets formed in the respective sections of the cover.

4. The device according to claim 1, wherein each of said sections includes ends carrying fasteners for fastening them to the vehicle.

5. The device according to claim 1, wherein said housing has an upper face in the shape of an air foil effective to cause the housing, when attached to the vehicle trunk lid, also to serve as a spoiler or rear wing for the vehicle.

* * * * *